US 12,475,801 B2
Nov. 18, 2025

(12) United States Patent
Belamkonda et al.

(54) AIRCRAFT TAXI ROUTE GENERATION

(71) Applicant: HONEYWELL INTERNATIONAL INC., Charlotte, NC (US)

(72) Inventors: Kameswararao Belamkonda, Charlotte, NC (US); Harithamma D, Charlotte, NC (US); Radhe Krishna Tiwari, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 228 days.

(21) Appl. No.: 17/822,588

(22) Filed: Aug. 26, 2022

(65) Prior Publication Data

US 2023/0066629 A1    Mar. 2, 2023

(30) Foreign Application Priority Data

Aug. 27, 2021    (IN)    ............................. 202111038874

(51) Int. Cl.
| | |
|---|---|
| *G08G 5/00* | (2006.01) |
| *G08G 5/21* | (2025.01) |
| *G08G 5/51* | (2025.01) |

(52) U.S. Cl.
CPC ............... *G08G 5/51* (2025.01); *G08G 5/21* (2025.01)

(58) Field of Classification Search
CPC ............................. G08G 5/065; G08G 5/0021
USPC ......................................................... 701/120
See application file for complete search history.

(56) References Cited

U.S. PATENT DOCUMENTS

| | | |
|---|---|---|
| 5,359,325 A | 10/1994 | Ford et al. |
| 5,675,661 A | 10/1997 | Richman |
| 7,343,229 B1 | 3/2008 | Wilson |
| 8,401,775 B2 | 3/2013 | Rozovski et al. |
| 8,723,686 B1 | 5/2014 | Murray et al. |
| 10,699,587 B2 | 6/2020 | Hvezda et al. |
| 2005/0171654 A1 | 8/2005 | Nichols et al. |
| 2009/0091268 A1 | 4/2009 | Forssen et al. |

(Continued)

FOREIGN PATENT DOCUMENTS

| | | |
|---|---|---|
| DE | 10026923 A1 | 2/2002 |
| DE | 102014112269 | 3/2016 |

(Continued)

OTHER PUBLICATIONS

Eurocontrol, "EUROCONTROL Specification for Advanced-Surface Movement Guidance and Control System (A-SMGCS) Services," Released Issue, https://www.eurocontrol.int/sites/default/files/2020-04/eurocontrol-specification-a-smgcs-v-2-0.pdf, Apr. 22, 2020, 150 pgs.

(Continued)

*Primary Examiner* — Tiffany P Young
(74) *Attorney, Agent, or Firm* — Brooks, Cameron & Huebsch, PLLC (57) ABSTRACT

Methods, devices, and systems for aircraft taxi route generation are described herein. One device includes a memory, and a processor to execute executable instructions stored in the memory to receive a routing plan request for an aircraft, generate, in response to receiving the routing plan request, a taxi route for the aircraft through an airfield of an airport using a rule engine, and transmit the taxi route to the aircraft, and a user interface to display a map of the airfield and the taxi route on the map of the airfield.

18 Claims, 7 Drawing Sheets

(56) References Cited

U.S. PATENT DOCUMENTS

| | | | |
|---|---|---|---|
| 2010/0198489 | A1 | 8/2010 | Rozovski et al. |
| 2011/0196599 | A1 | 8/2011 | Feyereisen et al. |
| 2011/0199239 | A1 | 8/2011 | Lutz et al. |
| 2012/0136562 | A1 | 5/2012 | Mere |
| 2012/0253649 | A1 | 10/2012 | McGuffin |
| 2013/0103297 | A1 | 4/2013 | Bilek et al. |
| 2014/0303815 | A1 | 10/2014 | Lafon et al. |
| 2016/0012737 | A1 | 1/2016 | Zimmer et al. |
| 2017/0083231 | A1* | 3/2017 | Wang ............... G08G 5/0021 |
| 2017/0178520 | A1 | 6/2017 | Papageorgiou |
| 2017/0226764 | A1 | 8/2017 | Nussbaum |
| 2018/0218620 | A1* | 8/2018 | Kalyan ............. G08G 5/0043 |
| 2018/0374370 | A1 | 12/2018 | Hvezda |
| 2019/0080616 | A1* | 3/2019 | Johnson ............ G08G 5/065 |
| 2020/0090531 | A1 | 3/2020 | Baladhandapani et al. |
| 2020/0242950 | A1* | 7/2020 | Guo .................. G01S 19/42 |
| 2022/0066025 | A1 | 3/2022 | Berkmo |
| 2022/0307853 | A1* | 9/2022 | Davis ................ B64D 43/02 |

FOREIGN PATENT DOCUMENTS

| | | |
|---|---|---|
| EP | 1071061 A1 | 1/2001 |
| EP | 3200171 A1 | 8/2017 |
| EP | 3680689 | 7/2020 |
| FR | 2939947 B1 | 6/2016 |

OTHER PUBLICATIONS

Chinrungrueng J, "Smart Parking: An Application of Optical Wireless Sensor Network," International Symposium on Applications and the Internet Workshops, Jan. 15, 2007, 5 pgs.

Tran, V.L., "A Study on Ship Automatic Berthing with Assistance of Auxiliary Devices," International Journal of Naval Architecture and Ocean Engineering, 2012, 13 pgs.

Mi, C., "Ship Identification Algorithm based on 3D Point Cloud for Automated Ship Loaders." Journal of Coastal Research, (73), 2015, 9 pgs.

Thupakula, K., "Data Fusion Techniques for Object Identification in Airport Environment." SAE Technical Paper 2017-01-2109, Sep. 19, 2017, 6 pgs.

Miller, I., "Team Cornell's Skynet: Robust Perception and Planning in an Urban Environment," Journal of Field Robotics, 25(8), 2008, 36 pgs.

Schumann, O., "Semantic Segmentation on Radar Point Clouds," International Conference on Information Fusion (FUSION), Jul. 2018, 9 pgs.

Aldoma, A., "Tutorial: Point Cloud Library: Three-Dimensional Object Recognition and 6 DoF Pose Estimation," IEEE Robotics & Automation Magazine 19, No. 3, 2012, 13 pgs.

I. Miller, "Sensitivity Analysis of a Tightly-Coupled GPS/INS System for Autonomous Navigation," IEEE Transactions on Aerospace and Electronic Systems, 48(2), 2012, 22 pgs.

Mund, J., "Introducing Lidar Point Cloud-based Object Classification for Safer Apron Operations," International Symposium on Enhanced Solutions for Aircraft and Vehicle Surveillance Applications, Apr. 2016, 11 pgs.

I. Miller, "Efficient Unbiased Tracking of Multiple Dy- namic Obstacles Under Large Viewpoint Changes," IEEE Transactions on Robotics, 27(1), Feb. 2011, 19 pgs.

F. Havlak, "Discrete and Continuous, Probabilistic Anticipation for Autonomous Robots in Urban Environments," IEEE Transactions on Robotics, 30(2), Apr. 2014, 15 pgs.

I. Miller, "Map-aided Localization in Sparse Global Positioning System Environments using Vision and Particle Filtering," Journal of Field Robotics, 28(5), Sep. 2011, 26 pgs.

Campbell, M. E., "Distributed Data Fusion: Neighbors, Rumors, and the Art of Collective Knowledge," IEEE Control Systems, 36(4), Aug. 2016, 28 pgs.

Deng, J., "Imagenet: A large-scale Hierarchical Image Database," IEEEConference on Computer Vision and Pattern Recognition, Jun. 2009, 9 pgs.

Rusu, R.B., "3D is Here: Point Cloud Library (Pcl)" IEEE International Conference on Robotics and Automation (ICRA), 2011, 5 pgs.

Ip, C.Y., "Retrieving Matching CAD Models by using Partial 3D Point Clouds," Computer-Aided Design and Applications, 4(5), 2007, 11 pgs.

Wohlkinger, W., "3Dnet: Large-scale Object Class Recognition from CAD Models," IEEE International Conference on Robotics and Automation, May 2012, 9 pgs.

Vock, R., "Fast Template Matching and Pose Estimation in 3D Point Clouds," Computers & Graphics, 79, 2019, 11 pgs.

Qi, C.R., "Pointnet: Deep Learning on Point Sets for 3D Classification and Segmentation," IEEE Conference on Computer Vision and Pattern Recognition, 2017, 20 pgs.

Wang, Y., "Pseudo-Lidar from Visual Depth Estimation: Bridging the Gap in 3D Object Detection for Autonomous Driving," IEEE/CVF Conference on Computer Vision and Pattern Recognition, 2019, 10 pgs.

Bar-Shalom, "Y. Estimation with applications to tracking and navigation: theory algorithms and software." John Wiley & Sons, 2001, 100 pgs.

Petrovskaya, A. "Model based vehicle detection and tracking for autonomous urban driving." Autonomous Robots, 26 (2-3), 2009, pp. 123-139.

ASP® Manual, @Safegate Group, Date Jul. 2010, Version 1.0, 109 pgs.

RELIANCE Power ACE3, Advanced Control Equipment, L-827/L-829, 2018; DS-3097-v3.1—Manual No. 96A0500 (2018)—ADB Safegate, 4 pgs.

Advisory Circular, U.S. Department of Transportation, Federal Aviation Administration, Subject: Specification for L-890 Airport Lighting Control and Monitoring System (ALCMS), Date: Sep. 29, 2011, Initiated by: AAS-100, Ac No. 150/5345-56B, 44 pgs.

User Manual—AGLAS PC Software, AGLAS—Airfield Ground Lighting Automation System, Version 3.0, ADB, A Siemens Company, Copyright 2006, 70 pgs.

SESAR Joint Undertaking, OFA04.02.01 (Integrated Surface Management) Final OSED, Edition 00.01.02, Nov. 10, 2016.†

SESAR Joint Undertaking, OFA04.02.01 (Integrated Management) Edition 00.01.01, Oct. 24, 2016.†

\* cited by examiner
† cited by third party

AIRCRAFT TAXI ROUTE GENERATION

CROSS-REFERENCE TO RELATED APPLICATIONS

This application claims priority pursuant to 35 U.S.C. 119(a) to Indian Application No. 202111038874, filed Aug. 27, 2021, which application is incorporated herein by reference in its entirety.

TECHNICAL FIELD

The present disclosure relates to methods, devices, and systems for aircraft taxi route generation.

BACKGROUND

Air traffic control (ATC) at an airport can direct aircraft on an airfield of the airport and aircraft in airspace near the airport, as well as provide advisory services to other aircraft in airspace not controlled by ATC at the airport. Directing aircraft on the airfield and in the air can prevent collisions between aircraft, organize and expedite aircraft traffic, and provide information and/or support for aircraft pilots.

ATC may need to direct many different aircraft in and/or around the airport. For example, an ATC controller may have to direct an outbound aircraft from a parking stand to a runway, an inbound aircraft from the runway to a parking stand, etc.

Pilots of aircraft at the airfield can receive instructions from ATC while at the airport. For example, an inbound aircraft can receive instructions from ATC on where to land, where to park the aircraft, a taxi route from the runway to a parking stand, etc.

DETAILED DESCRIPTION

Methods, devices, and systems for aircraft taxi route generation are described herein. In some examples, one or more embodiments include a memory, and a processor to execute executable instructions stored in the memory to receive a routing plan request for an aircraft, generate, in response to receiving the routing plan request, a taxi route for the aircraft through an airfield of an airport using a rule engine, and transmit the taxi route to the aircraft, and a user interface to display a map of the airfield and the taxi route on the map of the airfield.

When an aircraft is at an airport, taxi routes may be assigned to aircraft in order for the aircraft to navigate around the airport. Such assigned taxi routes may be generated and assigned in order to allow aircraft to safely navigate around the airport while avoiding other aircraft and/or vehicles at the airport.

Certain airports may include rules for assignment of taxi routes. For instance, the number of aircraft at the airport, different types of weather conditions, and/or time of the day, may be some factors that can affect taxi route assignment for an aircraft. For example, a particular wind strength and/or wind direction may cause aircraft to land and/or take off on a particular runway having a particular alignment relative to the wind direction, which can affect the taxi route from the runway to a parking stand.

Aircraft taxi route generation, in accordance with the present disclosure, can provide taxi routes for aircraft at the airport in accordance with airport rules. Such rules may be utilized by a rules engine that can generate taxi routes for aircraft and transmit such taxi routes to the aircraft to allow the aircraft to safely navigate through the airport. Such taxi route generation via the rules engine can help an ATC controller or other user generate and/or modify taxi routes while reducing "head down" time for an ATC controller or other user. Aircraft taxi route generation can be adaptable to different airports having various layouts and the associated airport systems by utilizing the rules engine and can provide for safe and efficient taxi route generation, which may reduce delays for passengers and/or airlines. Accordingly, such an approach can allow for an increase in efficiency and safety of airport operations.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

Figure 1:
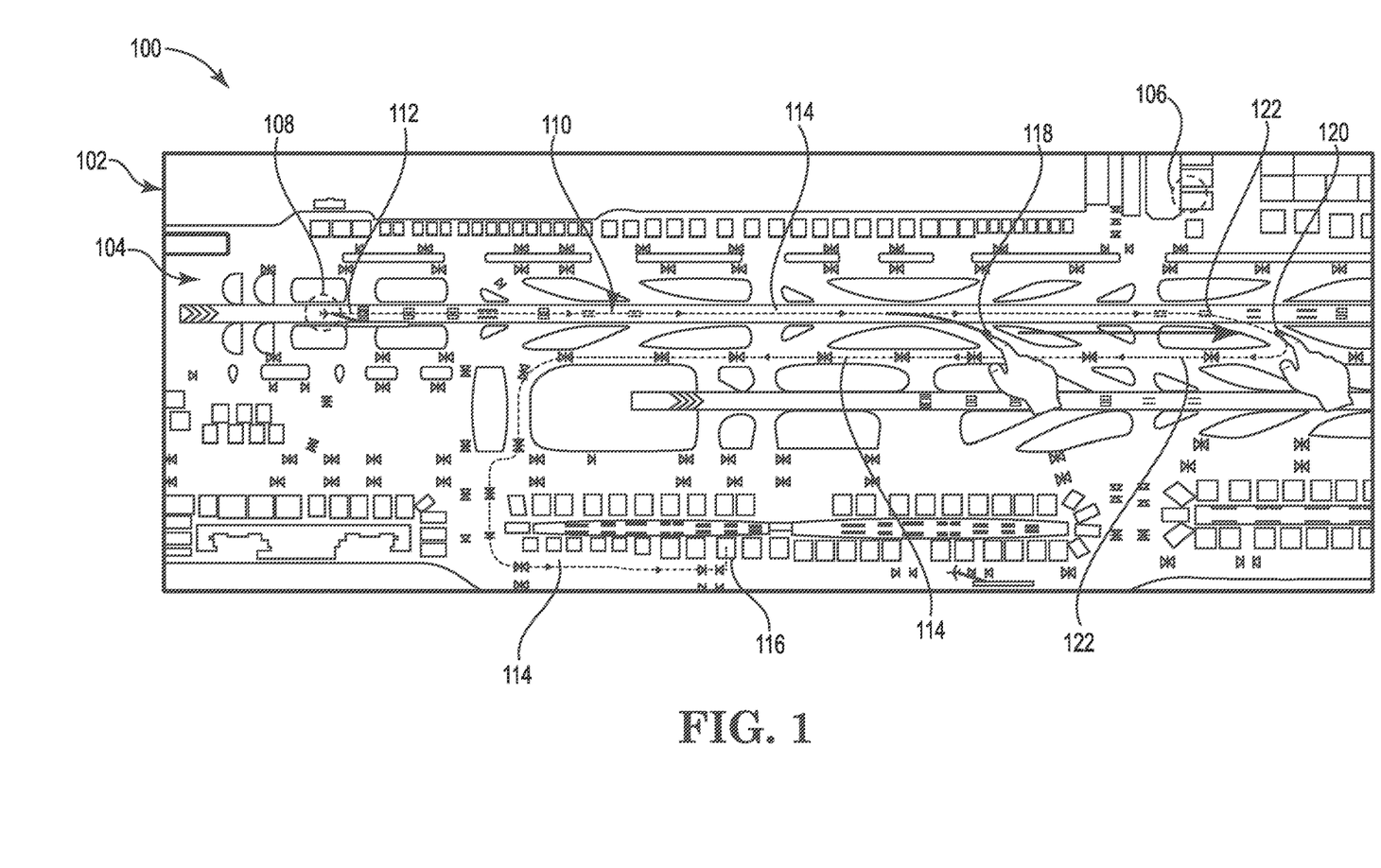
FIG. 1 is an illustration of a display provided on a user interface showing a map of an airfield and a modified taxi route having a modified runway exit, generated in accordance with one or more embodiments of the present disclosure.

FIG. 1 is an illustration of a display provided on a user interface showing a map 104 of an airfield 102 and a modified taxi route having a modified runway exit, generated in accordance with one or more embodiments of the present disclosure. As illustrated in FIG. 1, the airfield 102 can be part of an airport 100 and can include a computing device 106 and an aircraft 108.

As illustrated in FIG. 1, the airport 100 can include a computing device 106. As used herein, the term "computing device" refers to an electronic system having a processing resource, memory resource, and/or an application-specific integrated circuit (ASIC) that can process information. Examples of computing devices can include, for instance, a laptop computer, a notebook computer, a desktop computer, a server, networking equipment (e.g., router, switch, etc.), and/or a mobile device, among other types of computing devices. As used herein, a mobile device can include devices that are (or can be) carried and/or worn by a user. For example, a mobile device can be a phone (e.g., a smart phone), a tablet, a personal digital assistant (PDA), smart glasses, and/or a wrist-worn device (e.g., a smart watch), among other types of mobile devices.

For instance, the computing device 106 can be a computing device located at the airport 100. The computing device 106 can enable a user, such as an ATC controller, ground controller, and/or any other type of user to utilize the computing device 106 for aircraft taxi route generation according to embodiments of the present disclosure. The computing device 106 can be located at the airport 100 to be utilized for aircraft taxi route generation as is further described herein.

The computing device 106 can receive a routing plan request for the aircraft 108. A routing plan can be, for example, a route for a vehicle on the airfield 102 from a first location to a second location on the airfield 102. For example, a routing plan for the aircraft 108 may be requested to allow the aircraft 108 to transit from the runway to a parking stand. In such an example, the aircraft 108 may be an inbound aircraft such that the aircraft 108 is arriving at the airport 100. However, embodiments of the present disclosure are not so limited to inbound aircraft. For example, outbound aircraft (e.g., aircraft that are leaving the airport 100) may transmit a routing plan request to the computing device 106.

The computing device 106 can generate a taxi route 110 for the aircraft 108 in response to receiving the routing plan request. For example, the computing device 106 can generate a path from a first location to a second location on the airfield 102 for the aircraft 108. Such a path may be from a runway to a parking stand, from a runway to a hangar, from a parking stand to a de-icing pad, from a parking stand to a runway, among other examples.

The computing device 106 can generate the taxi route 110 for the aircraft 108 using a rule engine. As used herein, the term "rule engine" refers to a collection of procedures dictating actions to be taken based on input parameters. For example, the rule engine can include number of predetermined rules that can be utilized to generate a taxi route for an aircraft 108 based on certain attributes regarding the aircraft 108 and the airport 100. The number of predetermined rules can be based on aircraft attributes corresponding to a type of aircraft and/or airport attributes, as is further described herein.

The number of predetermined rules included in the rule engine can be based on aircraft attributes associated with the aircraft 108. The aircraft 108 can include various attributes associated with the aircraft, including an aircraft type (e.g., airplane, rotorcraft, glider, etc.), an aircraft manufacturer and/or model (e.g., Boeing 747-400), aircraft weight categories (e.g., A: heavy, E: medium, F: small, etc.), and/or an aircraft mode (e.g., inbound, outbound, towing, stand, deicing, etc.). For example, the aircraft 108 can include attributes including an aircraft type being an airplane, the aircraft 108 being a 747-400, the weight category of the aircraft 108 being "A" (e.g., heavy), and the aircraft 108 having an aircraft mode of "inbound".

The number of predetermined rules included in the rule engine can be based on airport attributes. The airport attributes can include various attributes associated with the airport 100, including an operational category (e.g., CAT I, CAT II, CAT III, etc.), which runway(s) at the airport 100 are operational, weather conditions at the airport 100, the amount of traffic (e.g., aircraft, ground vehicles, etc.), local regulations associated with the airport 100, and/or airport category, a location of parking stands or a group of parking stands, as well as other airport attributes.

The rule engine can be generated by specifying, via an input to the computing device 106, the aircraft attributes and/or the airport attributes. For example, a user may input aircraft attributes and airport attributes to generate various rules to apply to aircraft at the airport 100. For example, a user may specify that for heavy aircraft that are inbound in CAT I operating conditions when wind speeds are over a threshold speed from a specified direction (e.g., out of the west), that such aircraft should land on a specific runway in a specific direction. As another example, a user may specify that for light aircraft that are outbound in CAT III operating conditions, such light aircraft should not make a runway crossing when taxiing.

In some examples, such rules may be specified and generated via a user interface associated with the computing device 106. For example, a user may specify the aircraft attributes and/or airport attributes for various scenarios by selecting options via a user interface to specify the attributes of the aircraft and/or airport for the rules for use by the rule engine.

In some examples, such rules may be specified and generated via a configuration file (e.g., a config file). For example, a user may generate a configuration file that configures various parameters and settings that specify aircraft attributes and/or airport attributes for various scenarios, where such parameters and settings may be configured in a particular syntax for use by the rule engine.

The computing device 106 can generate the number of predefined rules utilizing the aircraft attributes and/or the airport attributes. Utilizing the aircraft attributes and/or the airport attributes specified via a user interface associated with the computing device 106 and/or the configuration file, the computing device 106 can generate the rule engine that includes the number of predefined rules.

The computing device 106 can, as mentioned above, generate a taxi route 110 for the aircraft 108 using the rule engine. For example, as previously described above, the aircraft 108 can be a heavy inbound aircraft when the airport 100 is operating in CAT I operating conditions with a wind speed exceeding a threshold speed out of the west. Accordingly, since the aircraft 108 may land on the runway in an easterly direction (e.g., left to right, as oriented in FIG. 1) as a result of the known wind speed and direction, the computing device 106 can generate the taxi route 110 for the aircraft 108 using the rule engine by generating the taxi route 110 that allows the aircraft 108 to exit the runway as the aircraft 108 moves east along the runway. The taxi route 110 can then allow the aircraft 108 to taxi to a parking stand at a terminal at the airport 100.

Following generation of the taxi route 110, the computing device 106 can transmit the taxi route 110 to the aircraft 108. Such a transmission can allow the aircraft 108 to receive the taxi route 110 so that the pilot(s) of the aircraft 108 can follow the taxi route 110 to the parking stand to safely transit the airfield 102.

In some examples, the computing device 106 can include a user interface. The user interface can display the map 104 of the airfield 102 and the taxi route 110 on the map 104 of the airfield. However, embodiments of the present disclosure are not so limited. For example, the user interface can be associated with the computing device 106. That is, the user interface may be a user interface of a mobile device connected to the computing device 106. As used herein, a mobile device can include devices that are (or can be) carried and/or worn by the user. The mobile device can be a phone (e.g., a smart phone), a tablet, a personal digital assistant (PDA), smart glasses, and/or a wrist-worn device (e.g., a smart watch), among other types of mobile devices.

As illustrated in FIG. 1, the taxi route 110 can include a start point 112, an end point 116, and a path 114 between the start point 112 and the end point 116. For example, the start point 112 can be on the runway since the aircraft 108 is an inbound aircraft (e.g., arriving at the airport 100). The path 114 can lead from the start point 112 to the end point 116, where the end point 116 can be a parking stand on the airfield 102.

In some examples, a user of the computing device 106 may desire to modify the taxi route 110. For example, the path 114 may be located on a taxiway with other traffic (e.g., other aircraft, other airport vehicles, etc.), and the user may desire to route the aircraft 108 around the other traffic. The computing device 106 can, accordingly, receive a taxi route modification input to modify the taxi route 110 through the airfield 102.

To computing device 106 can modify the taxi route 110 through the airfield in response to receiving a taxi route modification input. The taxi route modification input can be, for instance, an input received at the computing device 106 (e.g., a touch-screen input received at the user interface associated with the computing device 106, among other examples).

As illustrated in FIG. 1, the taxi route modification input can be a user's finger touching a location on the path 114 displayed on the user interface associated with the computing device 106. For example, the user's finger can touch a selection point 118 on the path 114 of the taxi route 110 between the start point 112 and the end point 116. The user can "drag" their finger across the map 104 to a drop point 120 on the airfield 102. Once at the drop point 120, the user may lift their finger off the user interface. This can result in a modification of the taxi route 110.

The computing device 106 can generate a modified taxi route by generating a modified path 122 between the drop point 120 and the end point 116. For example, when the taxi route 110 is modified in a middle of the route, the route section from the drop point 120 back to the start point 112 can be unchanged, and the route from the drop point 120 to the end point 116 can be modified to result in the modified path 122.

In some examples, a portion of the taxi route 110 may be user specified. For example, the user may specify the portion of the taxi route 110 on the runway. When the taxi route 110 is modified after the portion of the taxi route 110 on the runway, the portion of the taxi route 110 on the runway may be unchanged unless a specific (new) drop point is selected on the user specified portion of the taxi route 110.

As illustrated in FIG. 1, the computing device 106 can generate a modified taxi route by modifying the path 114 between the start point 112 and the end point 116. Modifying the path 114 can include selecting a selection point 118 near a runway exit area defining an exit route off a runway on the path 114 of the taxi route 110 between the start point 112 and the end point 116. The drop point 120 can be at a different runway exit area as illustrated in FIG. 1. Accordingly, the computing device 106 can generate the modified taxi route by modifying the exit route to the different runway exit area from the runway at the drop point 120. In other words, if the drop point 120 is near a runway exit area for an inbound aircraft 108, the computing device 106 may consider the route modification as an exit route change.

When such a modification occurs, the computing device 106 can generate a new rule to be stored in the rule engine in response to the modified taxi route being generated. For example, the computing device 106 can generate a new rule that when future heavy aircraft are inbound when the airport 100 is operating in CAT I operating conditions with a wind speed exceeding a threshold speed out of the west, the computing device 106 can generate a taxi route 110 having a runway exit area near the drop point 120 instead of the selection point 118.

In some examples, the computing device 106 can generate a prompt prior to generating the new rule. For instance, a user of the computing device 106 may not desire the computing device 106 to always generate the taxi route 110 having the runway exit area near the drop point 120 when future heavy aircraft are inbound when the airport 100 is operating in CAT I operating conditions with a wind speed exceeding a threshold speed out of the west. Accordingly, if the user declines the new rule (e.g., via the prompt) or does not provide an input, the computing device 106 can discard the new rule rather than saving it to the rule engine. However, if the user does desire taxi routes 110 having the runway exit area near the drop point 120 when future heavy aircraft are inbound when the airport 100 is operating in CAT I operating conditions with a wind speed exceeding a threshold speed out of the west, the computing device 106 can save the new rule to the rule engine and utilize it when the above conditions are met for future inbound aircraft.

As mentioned above, the computing device 106 can generate the modified taxi route by generating the modified path 122. Following generation of the modified taxi route, the computing device 106 can transmit the modified taxi route to the aircraft 108. Such a transmission can allow the aircraft 108 to receive the modified taxi route so that the pilot(s) of the aircraft 108 can follow the modified taxi route to the parking stand to safely transit the airfield 102.

Figure 2:
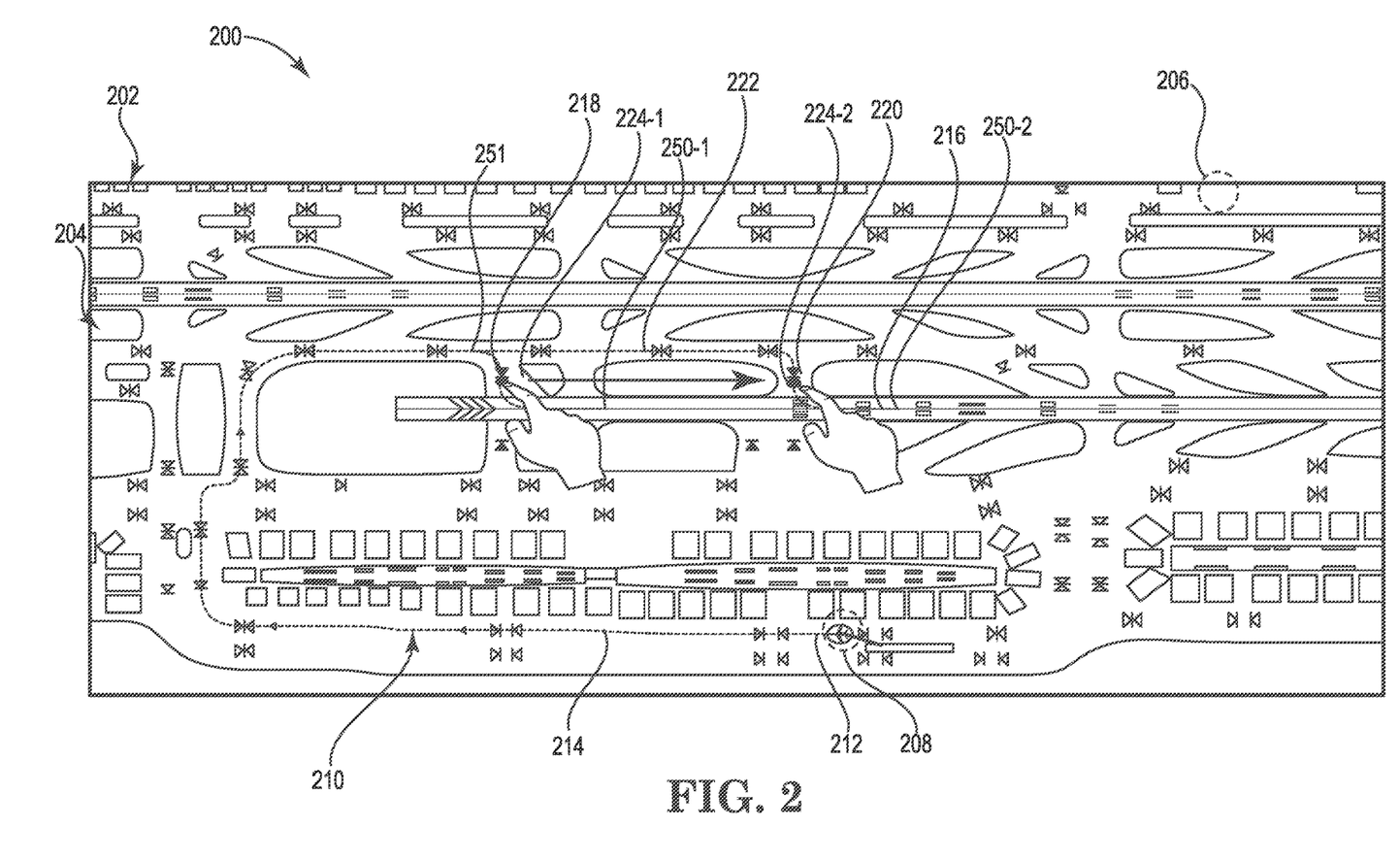
FIG. 2 is an illustration of a display provided on a user interface showing a map of an airfield and a modified taxi route having a modified lineup entry, generated in accordance with one or more embodiments of the present disclosure.

FIG. 2 is an illustration of a display provided on a user interface showing a map 204 of an airfield 202 and a modified taxi route having a modified lineup entry 224-2, generated in accordance with one or more embodiments of the present disclosure. As illustrated in FIG. 2, the airfield 202 can be part of an airport 200 and can include a computing device 206 and an aircraft 208.

As illustrated in FIG. 2, the aircraft 208 can have a start point 212 at a parking stand and an end point 216 on the runway of the airfield 202. As such, the aircraft 208 can be an outbound aircraft (e.g., an aircraft departing from the airport 200).

The taxi route 210 for the aircraft 208 can include the start point 212 at the parking stand. The path 214 from the start point 212 can lead to the runway via the first lineup entry 224-1 so that the aircraft may take off from the first take-off point 250-1 corresponding to the first lineup entry 224-1. At the first lineup entry 224-1, the aircraft 208 can wait for the runway to clear and to receive clearance to enter the runway and take off from the first take-off point 250-1 from the airport 200.

A user of the computing device 206 may desire to modify the taxi route 210 by modifying the path 214 between the start point 212 and the end point 216. That is, the user may desire to modify the lineup entry 224-1 for the aircraft 208. Modification of the lineup entry 224-1 may be a result of the user desiring to modify the first take-off point 250-1.

In order to modify the lineup entry 224-1, the computing device 206 can receive a taxi route modification input including the user's finger touching the selection point 218 on a location on the path 214 between the start point 212 and the end point 216 near the first lineup entry 224-1 for the runway. When the user touches the selection point 218, the user interface can display an icon indicating to the user the selection point 218 is selected. The user can "drag" their finger across the map 204 to the drop point 220 associated with the second lineup entry 224-2 for the runway. Once at the drop point 220, the user may lift their finger off the user interface. When the user lifts their finger off the user interface at the drop point 220, the user interface can display another icon indicating to the user the drop point 220. This can result in a modification of the taxi route 210. For example, the computing device 206 can modify the lineup entry from the first lineup entry 224-1 to the second lineup entry 224-2 for the runway, as well as modify the take-off point from the first take-off point 250-1 to the second take-off point 250-2. In other words, if the selection point 218 is near a first lineup entry 224-1 and the drop point 220 is near a second lineup entry 224-2 for an outbound aircraft 208, the computing device 206 may consider the route modification as a lineup entry change and/or consider the route modification as a take-off point change.

Accordingly, the computing device 206 can generate the modified taxi route by generating the modified path 222 from the first lineup entry 224-1 (e.g., and the first take-off point 250-1) to the second lineup entry 224-2 (e.g., and to the second take-off point 250-2). Following generation of the modified taxi route, the computing device 206 can transmit the modified taxi route to the aircraft 208. Additionally, as mentioned above, the computing device 206 can generate a new rule and generate a prompt to determine whether or not to save the new rule in the rule engine, as previously described in connection with FIG. 1. The computing device 206 can then save the rule to the rule engine or discard the rule based on an input to the generated prompt.

In some examples, a portion of the path 214 before the selection point 218 can be retained as much as possible. For example, the path 214 from the parking stand (e.g., the start point 212) to the point 251 can remain unchanged. The point 251 can be the point at which the path 214 diverges from the initial path (e.g., unmodified path) as a result of the drag and drop operation by the user.

The computing device 206 can utilize the rule engine as well as machine learning techniques in order to determine whether a user's drag/drop action is intended to cause a certain action. For example, the computing device 206 can determine, based on the drop point 220 (e.g., being located near the second line-up entry 224-2) as well as the selection point 218 (e.g., being located near the first line-up entry 224-1), as well as based on previous actions taken by a user and previous rules included in the rule engine, that the user is intending to cause a line-up entry change, and as a result, a take-off point change. In other words, based on the context of the path 214 of the taxi route 210 and the modified path 222 based on the selection point 218 and drop point 220, the computing device 206 can determine an intention of the action to be caused (e.g., in FIG. 2, a lineup entry change and a take-off point change).

Figure 3:
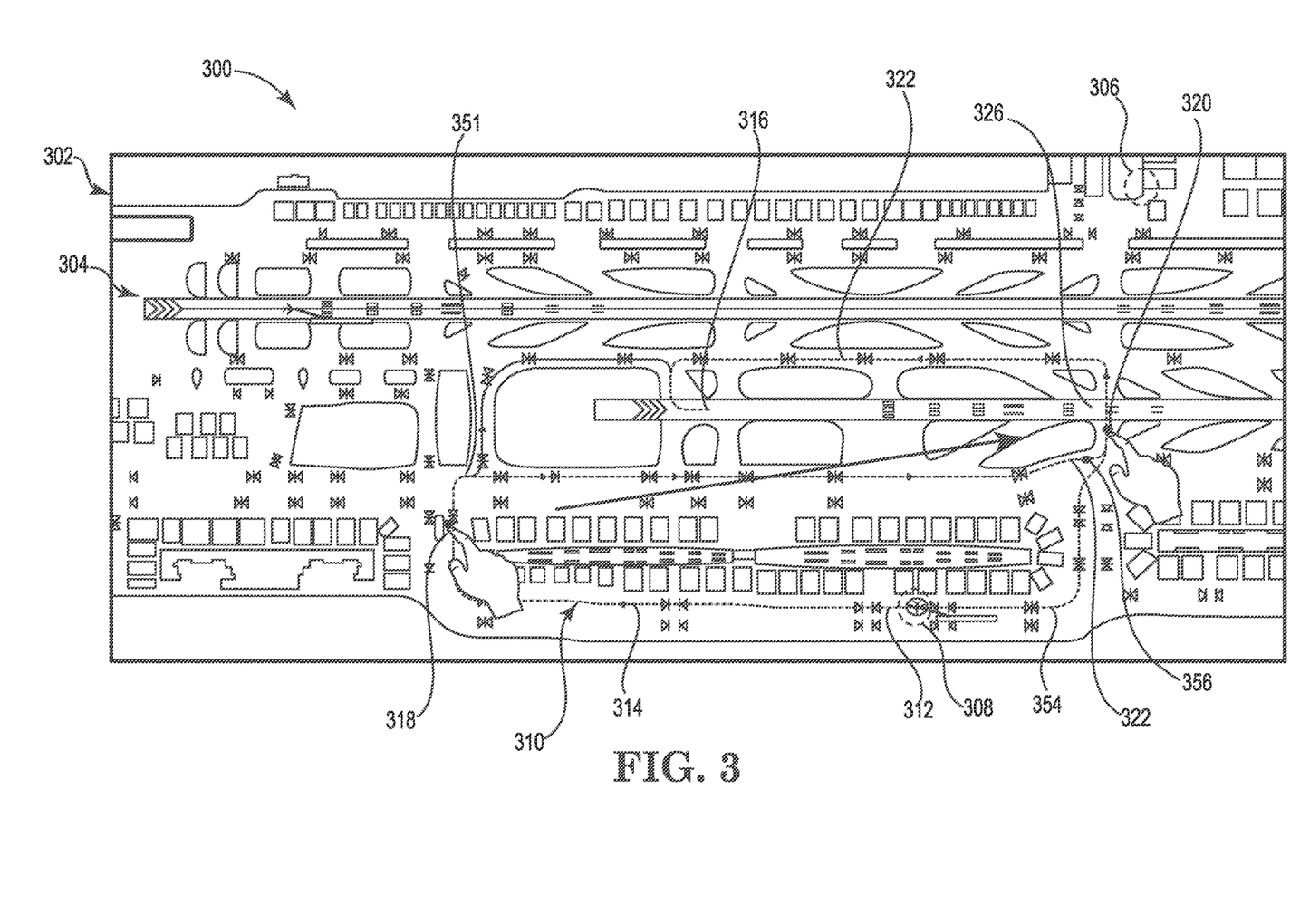
FIG. 3 is an illustration of a display provided on a user interface showing a map of an airfield and a modified taxi route having a runway crossing, generated in accordance with one or more embodiments of the present disclosure.

FIG. 3 is an illustration of a display provided on a user interface showing a map 304 of an airfield 302 and a modified taxi route having a runway crossing 326, generated in accordance with one or more embodiments of the present disclosure. As illustrated in FIG. 3, the airfield 302 can be part of an airport 300 and can include a computing device 306 and an aircraft 308.

The taxi route 310 for the aircraft 308 can include the start point 312 at the parking stand. The path 314 from the start point 312 can lead to the runway.

A user of the computing device 306 may desire to modify the taxi route 310 by modifying the path 314 between the start point 312 and the end point 316. The user may desire to modify the path 314 in order to help the aircraft 308 avoid other traffic at the airport, among other reasons.

In order to modify the taxi route 310, the computing device 306 can receive a taxi route modification input including the user's finger touching the selection point 318 on a location on the path 314 between the start point 312 and the end point 316. The user can "drag" their finger across the map 304 to the drop point 320, where the drop point 320 is on a runway crossing of the runway. Once at the drop point 320, the user may lift their finger off the user interface. This can result in a modification of the taxi route 310. For example, the computing device 306 can modify the taxi route 310 to generate the modified path 322 that includes a runway crossing of the runway. That is, if the drop point 320 is on a runway crossing, the computing device 306 may generate the modified taxi route by generating the modified path 322 through the runway crossing of the runway by retaining the line-up entry and take-off point.

In some examples, a portion of the path 314 before the point 351 (e.g., the divergence point) can be retained as much as possible. For example, the path 314 from the parking stand (e.g., the start point 312) to the point 351 can remain unchanged. The point 351 can be the point at which the path 314 diverges from the initial path (e.g., unmodified path) as a result of the drag and drop operation by the user.

If the drop point 320 is on a runway crossing of the runway, the computing device 306 can generate the modified taxi route including a runway crossing of the runway. However, embodiments of the present disclosure are not so limited. For instance, in the absence of the drop point 320 being on the runway crossing, the computing device 306 can generate a modified path that avoids crossing restricted areas of the airfield 302. Restricted areas can be areas which may require additional or special clearance to enter. Restricted areas can include, for instance, runways, runway crossings, deicing pads, etc. Accordingly, the computing device 306 can generate a modified taxi route that avoids runways, runway crossings, deicing pads, and/or other restricted areas on the airfield 302 unless specifically requested by a user of the computing device (e.g., by dropping a drop point on the restricted area).

The computing device 306 can generate the modified taxi route by generating the modified path 322 including the runway crossing 326. Following generation of the modified taxi route, the computing device 306 can transmit the modified taxi route to the aircraft 308. Additionally, as mentioned above, the computing device 306 can generate a new rule and generate a prompt to determine whether or not to save the new rule in the rule engine, as previously described in connection with FIG. 1. The computing device 306 can then save the rule to the rule engine or discard the rule based on an input to the generated prompt.

The computing device 306 can utilize the rule engine as well as machine learning techniques in order to determine whether a user's drag/drop action is intended to cause a certain action. For example, the computing device 306 can determine, based on the drop point 320 (e.g., being located near the runway crossing 326) as well as the selection point 318 (e.g., being a point on the path 314), as well as based on previous actions taken by a user and previous rules included in the rule engine, that the user is intending to cause a change in the path 314 that includes a runway crossing. In other words, based on the context of the path 314 of the taxi route 310 and the modified path 322 based on the selection point 318 and drop point 320, the computing device 306 can determine an intention of the action to be caused (e.g., in FIG. 3, the path 314 to be modified to the modified path 322 that includes the runway crossing 326).

In some examples, the modified taxi route that is generated including the modified path 322 may not be a path the user expects. For example, after lifting their finger off the user interface to the drop point 320, the computing device may generate the modified path 322 as illustrated in FIG. 3. However, the user may intend for the computing device 306 to generate the intended path 354. A user may select an "undo" function in order to undo the generated modified path 322. For example, the user interface can display an undo function that when selected by a user, undoes the most recently performed path modification. As such, the computing device 306 can, when receiving an input to the undo function, undo the generated modified path 322. A user may then select a different selection point and drop point in order to cause the computing device 306 to generate a modified path that follows the intended path 354.

In some examples, the drop point may be ambiguous so the computing device 306 may not know exactly what the user intends. For example, a user may select the selection point 318, drag their finger across the map 304 but to a different drop point 356. Accordingly, the computing device 306 may not know whether the user intends for merely a change in the path of the taxi route 310, or intends for a runway crossing at runway crossing 326 to occur. The computing device 306 may utilize the rule engine, machine learning to determine, based on past inputs to the computing device 306, that a user intends for the modified path 322 to include the runway crossing 326 (e.g., a user in the past selected drop points further from the different drop point 356 and made further inputs to include the runway crossing, so since the different drop point 356 is closer to the past selected drop points, the user likely intends for the runway crossing 326). In other words, the computing device 306 can utilize past inputs to resolve ambiguous drop points to aid in taxi route modification.

As illustrated in FIG. 3, the path 314 of the taxi route 310 may be modified to include the runway crossing 326. After causing generation of the modified path 322, the user may perform another taxi route modification by further selecting the path 314 and moving the path 314 to the different drop point 356, as the user may no longer desire the aircraft 308 to taxi to the right (e.g., as oriented in FIG. 3) from the start point 312, but rather to the left along the intended path 354 towards the runway crossing 326. In other words, the drag/drop operations can be free-form operations in that the user may select different selection points and drop points to result in a particular modified path.

Figure 4:
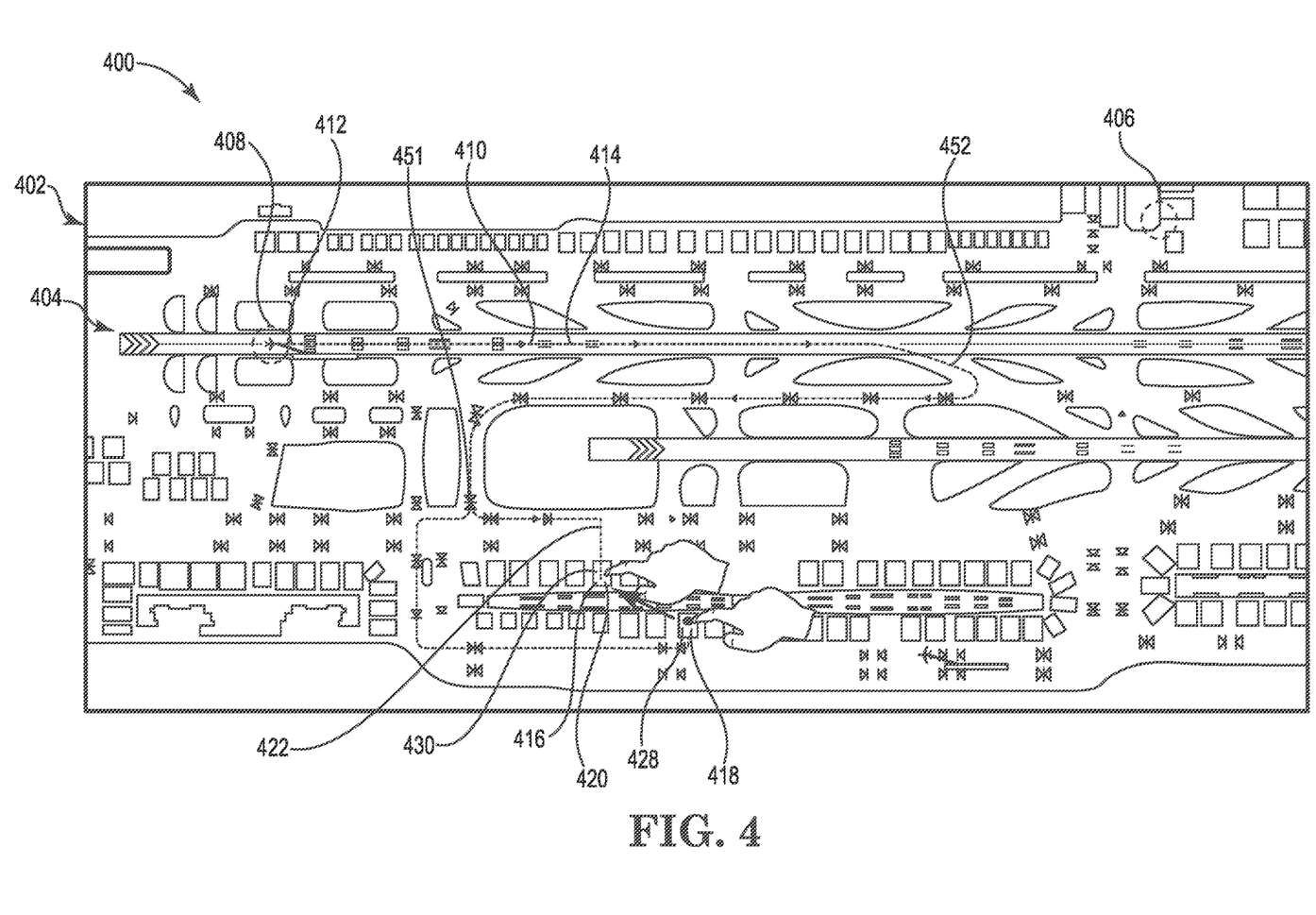
FIG. 4 is an illustration of a display provided on a user interface showing a map of an airfield and a modified taxi route based on a selection of a different parking stand, generated in accordance with one or more embodiments of the present disclosure.

FIG. 4 is an illustration of a display provided on a user interface showing a map 404 of an airfield 402 and a modified taxi route based on a selection of a different parking stand 430, generated in accordance with one or more embodiments of the present disclosure. As illustrated in FIG. 4, the airfield 402 can be part of an airport 400 and can include a computing device 406 and an aircraft 408.

As illustrated in FIG. 4, the aircraft 408 can have a start point 412 at a runway and an end point 416 at a parking stand 428. As such, the aircraft 408 can be an inbound aircraft (e.g., an aircraft arriving at the airport 400).

The taxi route 410 for the aircraft 408 can include the start point 412 at the runway. The path 414 from the start point 412 can lead to the parking stand 428.

A user of the computing device 406 may desire to modify the taxi route 410 by modifying the end point 416 (e.g., modify the parking stand the aircraft 408 is to park at). The user may desire to modify the parking stand 428 as the parking stand 428 may be occupied by another aircraft, among other reasons.

In order to modify the taxi route 410 to end at the different parking stand 430, the computing device 406 can receive a taxi route modification input including the user's finger touching the parking stand 428 corresponding to a current end point of the path 414. The user can "drag" their finger across the map 404 to the drop point 420 to select the different parking stand 430, where the different parking stand 430 corresponds to a revised end point 416 of the path 414. Once at the drop point 420, the user may lift their finger off the user interface. This can result in a modification of the taxi route 410. For example, the computing device 406 can modify the taxi route 410 to generate the modified path 422 that includes the end point 416 at the different parking stand 430. That is, if the selection point 418 is on a parking stand 428 and the drop point 420 is on a different parking stand 430, the computing device 406 may generate the modified taxi route by generating the modified path 422 to the modified end point at the different parking stand 430. In other words, if the selection point 418 is a parking stand 428 and the drop point 420 is a different parking stand 430, the computing device 406 can consider the route modification as a parking stand change.

In some examples, a portion of the path 414 before the point 451 can be retained as much as possible. For example, the path 414 from the runway exit 452 to the point 451 can remain unchanged. The point 451 can be the point at which the path 414 diverges from the initial path (e.g., unmodified path) as a result of the drag and drop operation by the user to modify the parking stand from parking stand 428 to the different parking stand 430.

The computing device 406 can generate the modified taxi route by generating the modified path 422 to the different parking stand 430. Following generation of the modified taxi route, the computing device 406 can transmit the modified taxi route to the aircraft 408. Additionally, as mentioned above, the computing device 406 can generate a new rule and generate a prompt to determine whether or not to save the new rule in the rule engine, as previously described in connection with FIG. 1. The computing device 406 can then save the rule to the rule engine or discard the rule based on an input to the generated prompt.

The computing device 406 can utilize the rule engine as well as machine learning techniques in order to determine whether a user's drag/drop action is intended to cause a certain action. For example, the computing device 406 can determine, based on the drop point 420 (e.g., being located on the different parking stand 430) as well as the selection point 418 (e.g., being located on the parking stand 428), as well as based on previous actions taken by a user and previous rules included in the rule engine, that the user is intending to cause a change in the assigned parking stand for the aircraft 408. In other words, based on the context of the path 414 of the taxi route 410 and the modified path 422 based on the selection point 418 and drop point 420, the computing device 406 can determine an intention of the action to be caused (e.g., in FIG. 4, the parking stand 428 to be modified to the different parking stand 430).

Figure 5A:
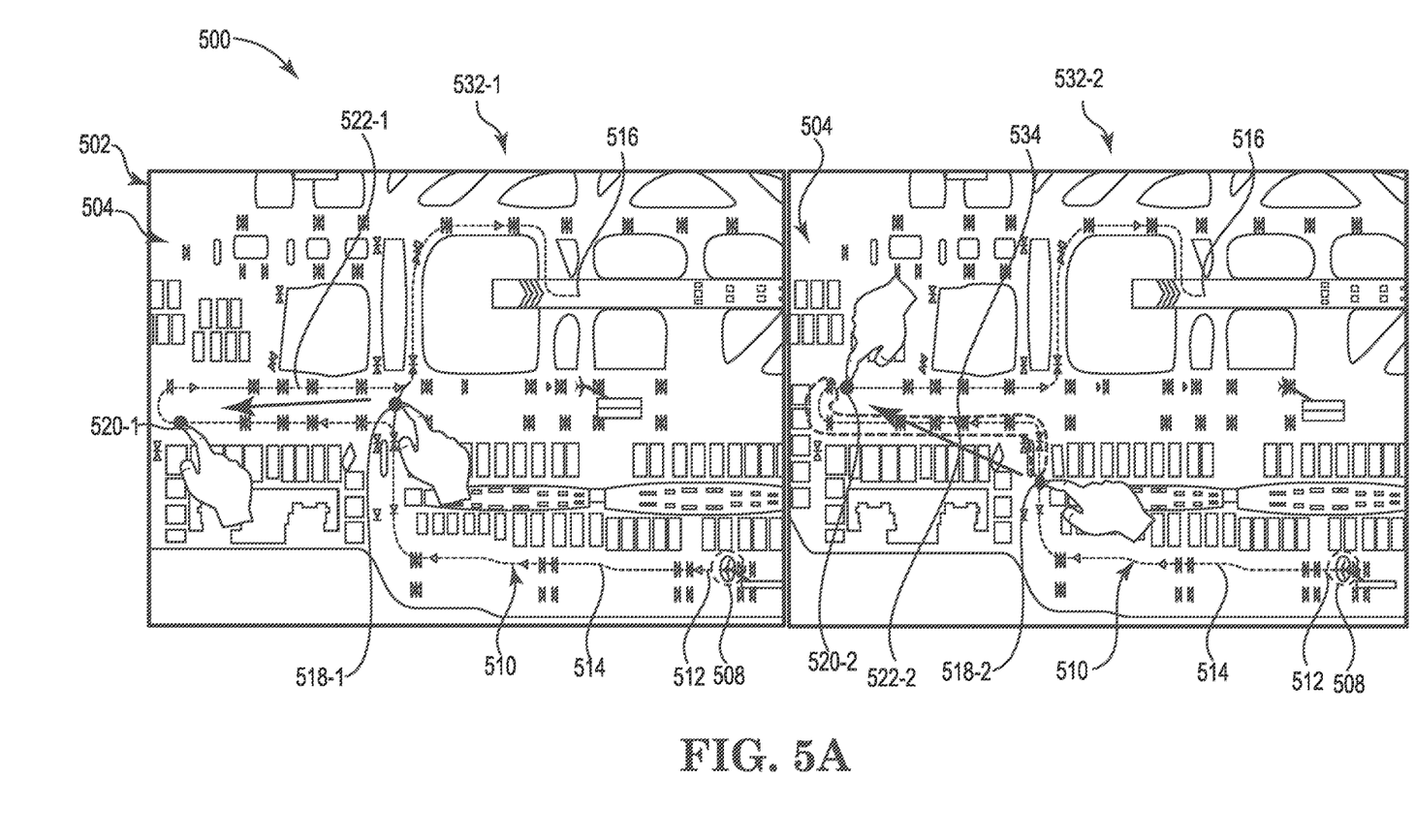
FIG. 5A is an illustration of a display provided on a user interface showing a map of an airfield and a modified taxi route at different route generation steps, generated in accordance with one or more embodiments of the present disclosure.

FIG. 5A is an illustration of a display provided on a user interface showing a map 504 of an airfield 502 and a modified taxi route at different route generation steps, generated in accordance with one or more embodiments of the present disclosure. As illustrated in FIG. 5A, the airfield 502 can be part of an airport 500 and can include an aircraft 508.

As illustrated in FIG. 5A at route generation step 532-1, the aircraft 508 can have a start point 512 at a parking stand and an end point 516 on the runway. The taxi route 510 for the aircraft can include the path 514 from the parking stand to the runway.

At the route generation step 532-1, the user may desire to modify the taxi route 510 by modifying the path 514 between the start point 512 and the end point 516. In order to modify the path 514, a computing device (e.g., computing device 106, 206, 306, 406, previously described in connection with FIGS. 1-4, respectively) can receive a taxi route modification input including the user's finger touching the selection point 518-1 on a location on the path 514 between the start point 512 and the end point 516. The user can "drag" their finger across the map 504 to the drop point 520-1. Once at the drop point 520-1, the user may lift their finger off the user interface. This can result in a modification of the taxi route 510 as illustrated in FIG. 5A at route generation step 532-1. Accordingly, the computing device can generate the modified taxi route by generating the modified path 522-1. Following generation of the modified taxi route, the computing device can transmit the modified taxi route to the aircraft 508, generate a new rule, and generate a prompt regarding the new rule, as previously described in connection with FIGS. 1-4, respectively.

At the route generation step 532-2, the user may attempt to modify the taxi route 510 by modifying the path 514 between the start point 512 and the end point 516. In order to modify the path 514, the computing device can receive a taxi route modification input including the user's finger touching the selection point 518-2 on a location on the path 514 between the start point 512 and the end point 516. The user can "drag" their finger across the map 504 to the drop point 520-2. Once at the drop point 520-2, the user may lift their finger off the user interface. However, generation of a further modified taxi route may result in a loop. As such, the computing device can generate modified path 522-2 that does not include a loop. In other words, the computing device can refrain from generating modified paths that include a loop by avoiding the last followed path 534. In this instance, the computing device can generate the modified taxi route by generating the modified path 522-2 by retaining the modified path 522-1. Refraining from following the last followed path 534 can prevent taxi routes that include loops on the airfield 502.

Figure 5B:
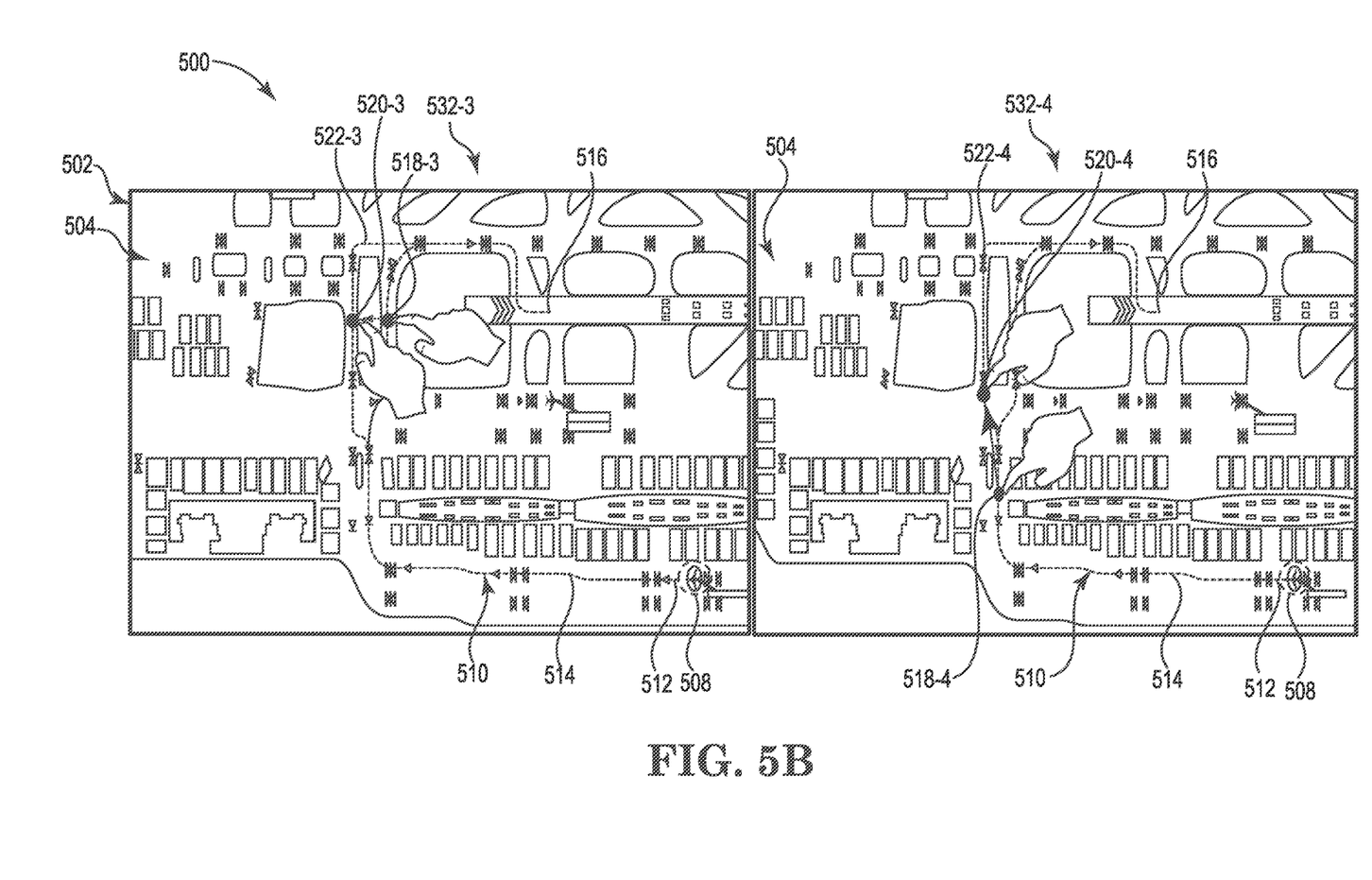
FIG. 5B is an illustration of a display provided on a user interface showing a map of an airfield and a modified taxi route at different route generation steps, generated in accordance with one or more embodiments of the present disclosure.

FIG. 5B is an illustration of a display provided on a user interface showing a map of an airfield and a modified taxi route at different route generation steps, generated in accordance with one or more embodiments of the present disclosure. As illustrated in FIG. 5B, the airfield 502 can be part of an airport 500 and can include an aircraft 508.

As illustrated in FIG. 5B, route generation steps 532-3 and 534-4 can allow for the generation of the same modified path 522 utilizing different selection points 518-3, 518-4 and different drop points 520-3, 520-4, respectively, as is further described herein. As illustrated in FIG. 5B at both route generation steps 532-3 and 532-4, the aircraft 508 can have a start point 512 at a parking stand and an end point 516 on the runway. The taxi route 510 for the aircraft can include the path 514 from the parking stand to the runway.

At route generation step 532-3, the user may desire to modify the taxi route 510 by modifying the path 514 between the start point 512 and the end point 516. In order to modify the path 514, a computing device (e.g., computing device 106, 206, 306, 406, previously described in connection with FIGS. 1-4, respectively) can receive a taxi route modification input including the user's finger touching the selection point 518-3 on a location on the path 514 between the start point 512 and the end point 516. The user can "drag" their finger horizontally across the map 504 to the drop point 520-3. Once at the drop point 520-3, the user may lift their finger off the user interface. This can result in a modification of the taxi route 510 as illustrated in FIG. 5B at route generation step 532-3. That is, the taxi route 510 can be modified by moving to a parallel taxiway. Accordingly, the computing device can generate the modified taxi route by generating the modified path 522-3. Following generation of the modified taxi route, the computing device can transmit the modified taxi route to the aircraft 508, generate a new rule, and generate a prompt regarding the new rule, as previously described in connection with FIGS. 1-4, respectively.

Alternatively, the user may again desire to modify the taxi route 510 by modifying the path 514 between the start point 512 and the end point 516. In order to modify the path 514, the computing device can receive a taxi route modification input including the user's finger touching the selection point 518-4 on a location on the path 514 between the start point 512 and the end point 516. The user can "drag" their finger across the map 504 to the drop point 520-4. Once at the drop point 520-4, the user may lift their finger off the user interface. This can result in a modification of the taxi route 510 as illustrated in FIG. 5B at route generation step 532-4. That is, the taxi route 510 can be modified by moving to the same parallel taxiway as the route generation step 532-3, but by utilizing a different selection point 518-4. Accordingly, the computing device can similarly generate the modified taxi route by generating the modified path 522-4, transmit the modified taxi route to the aircraft 508, generate a new rule, and generate a prompt regarding the new rule, as previously described in connection with FIGS. 1-4, respectively.

Aircraft taxi route generation, according to the present disclosure, can allow for safe and efficient taxi route generation for use by users such as ATC controllers and/or pilots of aircraft at an airfield of an airport. Such aircraft taxi route generation can assist an ATC controller or other user in the generation and/or modification of taxi routes, reducing time spent by the ATC controller generating/modifying such routes and allowing them to focus on other tasks. Additionally, such aircraft taxi routes can be generated utilizing a rules engine, which may be adaptable to different airports having different layouts and/or airport systems. Accordingly, such an approach can allow for an increase in efficiency and safety of airport operations, as compared with previous approaches.

Figure 6:
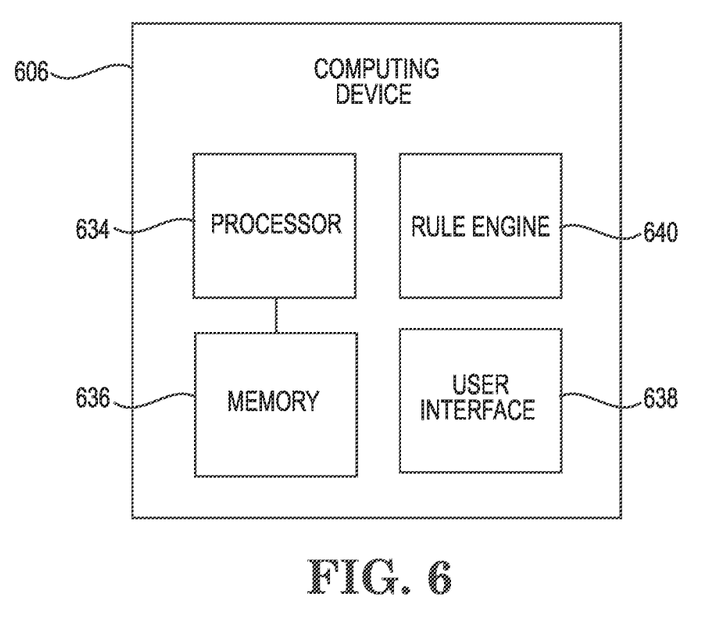
FIG. 6 is a computing device for aircraft taxi route generation, in accordance with one or more embodiments of the present disclosure.

FIG. 6 is a computing device 606 for aircraft taxi route generation, in accordance with one or more embodiments of the present disclosure. As illustrated in FIG. 6, computing device 606 can include a user interface 638, rule engine 640, memory 636 and a processor 634 for aircraft taxi route generation in accordance with the present disclosure.

Computing device 606 can be, for example, a laptop computer, a desktop computer, and/or a mobile device (e.g., a smart phone, tablet, personal digital assistant, smart glasses, a wrist-worn device, etc.), and/or redundant combinations thereof, among other types of computing devices.

The memory 636 can be any type of storage medium that can be accessed by the processor 634 to perform various examples of the present disclosure. For example, the memory 636 can be a non-transitory computer readable medium having computer readable instructions (e.g., computer program instructions) stored thereon that are executable by the processor 634 for aircraft taxi route generation in accordance with the present disclosure. The computer readable instructions can be executable by the processor 634 to redundantly perform the aircraft taxi route generation.

The memory 636 can be volatile or nonvolatile memory. The memory 636 can also be removable (e.g., portable) memory, or non-removable (e.g., internal) memory. For example, the memory 636 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 636 is illustrated as being located within computing device 606, embodiments of the present disclosure are not so limited. For example, memory 636 can also be located internal to another computing resource (e.g., enabling computer readable instructions to be downloaded over the Internet or another wired or wireless connection).

As illustrated in FIG. 6, computing device 606 includes a user interface 638. For example, the user interface 638 can display aircraft taxiway route generation (e.g., as previously described in connection with FIGS. 1-5) in a display. A user (e.g., operator) of computing device 606 can interact with computing device 606 via the user interface 638. For example, user interface 638 can provide (e.g., display and/or present) information to the user of computing device 606, and/or receive information from (e.g., input by) the user of computing device 606. For instance, in some embodiments, user interface 606 can be a graphical user interface (GUI) that can provide and/or receive information to and/or from the user of computing device 606. The display can be, for instance, a touch-screen (e.g., the GUI can include touch-screen capabilities). Alternatively, a display can include a television, computer monitor, mobile device screen, other type of display device, or any combination thereof, connected to computing device 606 and configured to receive a video signal output from the computing device 606.

As an additional example, user interface 638 can include a keyboard and/or mouse the user can use to input information into computing device 606. Embodiments of the present disclosure, however, are not limited to a particular type(s) of user interface.

User interface 638 can be localized to any language. For example, user interface 638 can display the airfield workflow management in any language, such as English, Spanish, German, French, Mandarin, Arabic, Japanese, Hindi, etc.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing device for aircraft taxi route generation, comprising:
  a memory;
  a processor configured to execute executable instructions stored in the memory to:
    receive a routing plan request for an aircraft;
    generate, in response to receiving the routing plan request, a taxi route for the aircraft through an airfield of an airport using a rule engine, wherein the taxi route includes a start point on the airfield, an end point on the airfield, and a path between the start point and the end point; and
    transmit the taxi route to the aircraft; and
  a user interface configured to:
    display a map of the airfield;
    display the taxi route on the map of the airfield; and
    receive a taxi route modification input to modify the taxi route through the airfield, wherein the taxi route modification input includes a selection of:
      a selection point on the path of the taxi route between the start point and the end point; and
      a drop point on the airfield;
    wherein the modified taxi route is displayed on the user interface in response to receiving the taxi route modification input, and wherein past inputs are utilized to resolve an ambiguous input for the drop point to aid in the modified taxi route in response to the selection of the drop point on the airfield being ambiguous.

2. The computing device of claim 1, wherein the rule engine includes a number of predetermined rules for generating the taxi route.

3. The computing device of claim 2, wherein the number of predetermined rules are based on aircraft attributes associated with the aircraft and airport attributes.

4. The computing device of claim 2, wherein the processor is configured to execute the instructions to generate the number of predetermined rules via the user interface.

5. The computing device of claim 2, wherein the processor is configured to execute the instructions to generate the number of predetermined rules via a configuration file.

6. The computing device of claim 1, wherein:
the processor is configured to execute the instructions to generate the modified taxi route by generating a modified path of the taxi route between the drop point and the end point; and
the path of the taxi route between the start point and the selection point is unchanged.

7. The computing device of claim 6, wherein the processor is configured to execute the instructions to:
generate a new rule in response to the modified taxi route being generated; and
update the rule engine with the new rule in response to the new rule being generated and in response to a user input accepting the new rule.

8. The computing device of claim 6, wherein the processor is configured to execute the instructions to transmit the modified taxi route to the aircraft.

9. A non-transitory computer readable medium having computer readable instructions stored thereon that are executable by a processor to:
receive a routing plan request for an aircraft;
generate, in response to receiving the routing plan request, a taxi route for the aircraft through an airfield of an airport using a rule engine, wherein the taxi route includes a start point on the airfield, an end point on the airfield, and a path between the start point and the end point;
receive a taxi route modification input via a user interface to modify the taxi route through the airfield, wherein the taxi route modification input includes a selection of:
a selection point on the path of the taxi route between the start point and the end point; and
a drop point on the airfield;
generate, in response to receiving the taxi route modification input, a modified taxi route for the aircraft through the airfield, wherein past inputs are utilized to resolve an ambiguous input for the drop point to aid in the modified taxi route in response to the selection of the drop point on the airfield being ambiguous; and
display the taxi route for the aircraft and the modified taxi route for the aircraft on the user interface.

10. The computer readable medium of claim 9, wherein the computer readable instructions are executable by the processor to generate the modified taxi route by modifying the path between the start point and the end point.

11. The computer readable medium of claim 10, wherein:
modifying the path between the start point and the end point includes selecting a selection point at a runway exit area defining an exit route off a runway on the path of the taxi route between the start point and the end point; and
the computer readable instructions are executable by the processor to generate the modified taxi route by modifying the exit route to a different runway exit area from the runway.

12. The computer readable medium of claim 10, wherein:
modifying the path between the start point and the end point includes selecting a selection point at a lineup entry for a runway on the path of the taxi route between the start point and the end point; and
the computer readable instructions are executable by the processor to generate the modified taxi route by modifying the lineup entry to a different lineup entry for the runway.

13. The computer readable medium of claim 10, wherein:
modifying the path between the start point and the end point includes:
selecting the selection point on the path of the taxi route between the start point and the end point, wherein the aircraft is an outbound aircraft from the airport; and
selecting the drop point on the airfield, wherein the drop point is on a runway crossing of a runway; and
the computer readable instructions are executable by the processor to generate the modified taxi route by generating a modified path through the runway crossing of the runway.

14. The computer readable medium of claim 9, wherein the computer readable instructions are executable by the processor to generate the modified taxi route by modifying the end point by:
selecting a parking stand corresponding to the end point of the path;
selecting a different parking stand, wherein the different parking stand corresponds to a revised end point of the path; and
generating a modified path from the start point to the revised end point at the different parking stand.

15. A method for aircraft taxi route generation, comprising:
receiving, by a computing device, a routing plan request for an aircraft;
generating, by the computing device in response to receiving the routing plan request, a taxi route for the aircraft through an airfield of an airport using a rule engine, wherein:
the taxi route includes a start point on the airfield, an end point on the airfield, and a path between the start point and the end point; and
the rule engine includes a number of predetermined rules based on aircraft attributes corresponding to a number of types of aircraft and airport attributes;
receiving, via a user interface, a taxi route modification input to modify the taxi route through the airfield, wherein the taxi route modification input includes a selection of:
a selection point on the path of the taxi route between the start point and the end point; and
a drop point on the airfield;
generating, by the computing device in response to receiving the taxi route modification input, a modified taxi route for the aircraft through the airfield, wherein past inputs are utilized to resolve an ambiguous input for the drop point to aid in the modified taxi route in response to the selection of the drop point on the airfield being ambiguous; and
displaying, on the user interface, the taxi route for the aircraft and the modified taxi route for the aircraft.

16. The method of claim 15, wherein the method includes generating the rule engine by:
- specifying, via an input to the computing device, the aircraft attributes and the airport attributes; and
- generating, by the computing device based on the aircraft attributes and the airport attributes, the number of predetermined rules.

17. The method of claim 15, wherein generating the modified taxi route includes generating a modified path that avoids crossing a restricted area.

18. The method of claim 15, wherein generating the modified taxi route includes generating a modified path that does not include a loop.

* * * * *